Nov. 26, 1929.  H. N. SHAW  1,737,437
ANTISKID ARMOR FOR CUSHION TIRE WHEELS
Filed Feb. 8, 1928  2 Sheets-Sheet 1
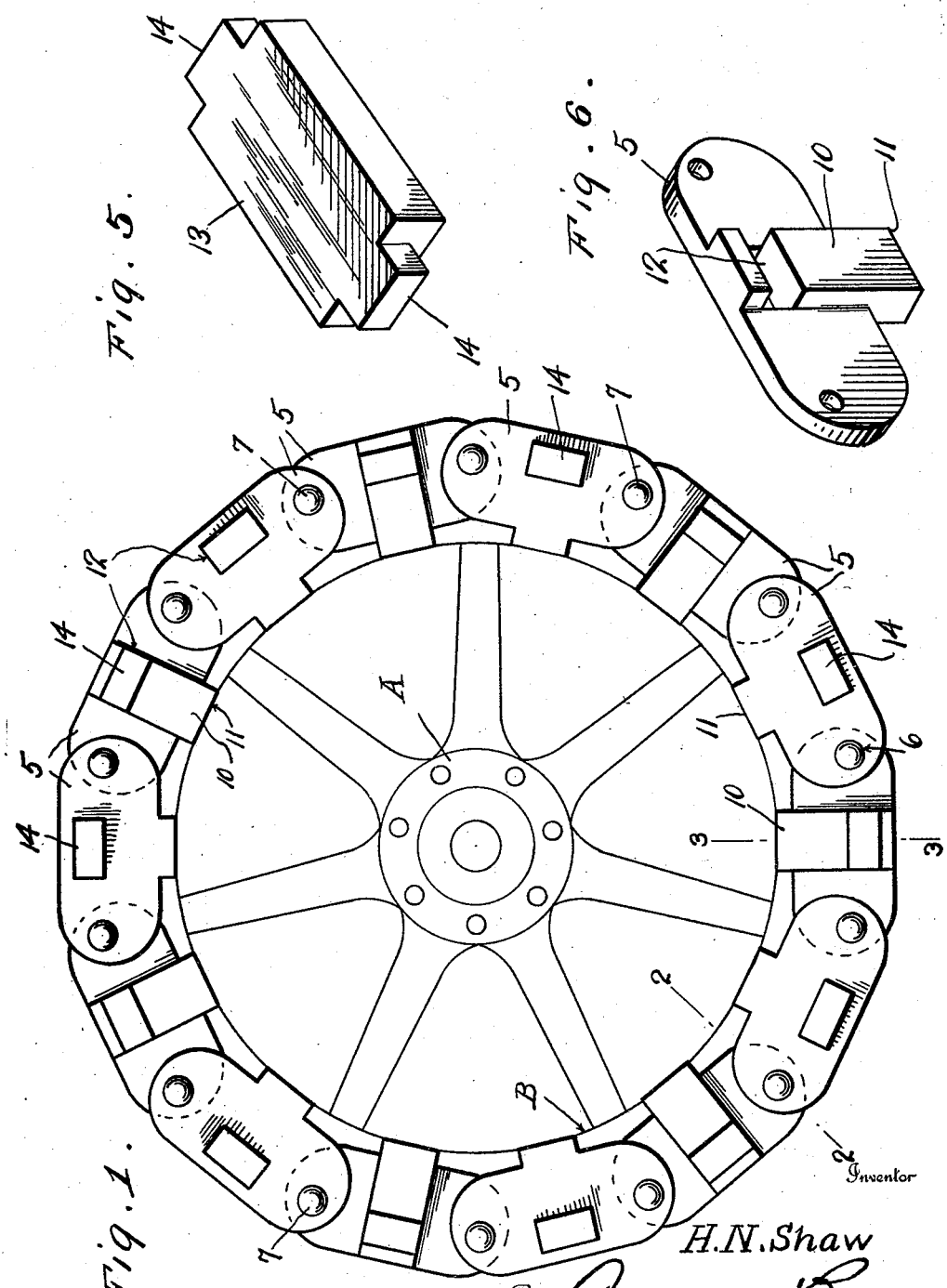

Nov. 26, 1929.          H. N. SHAW          1,737,437
ANTISKID ARMOR FOR CUSHION TIRE WHEELS
Filed Feb. 8, 1928          2 Sheets-Sheet 2
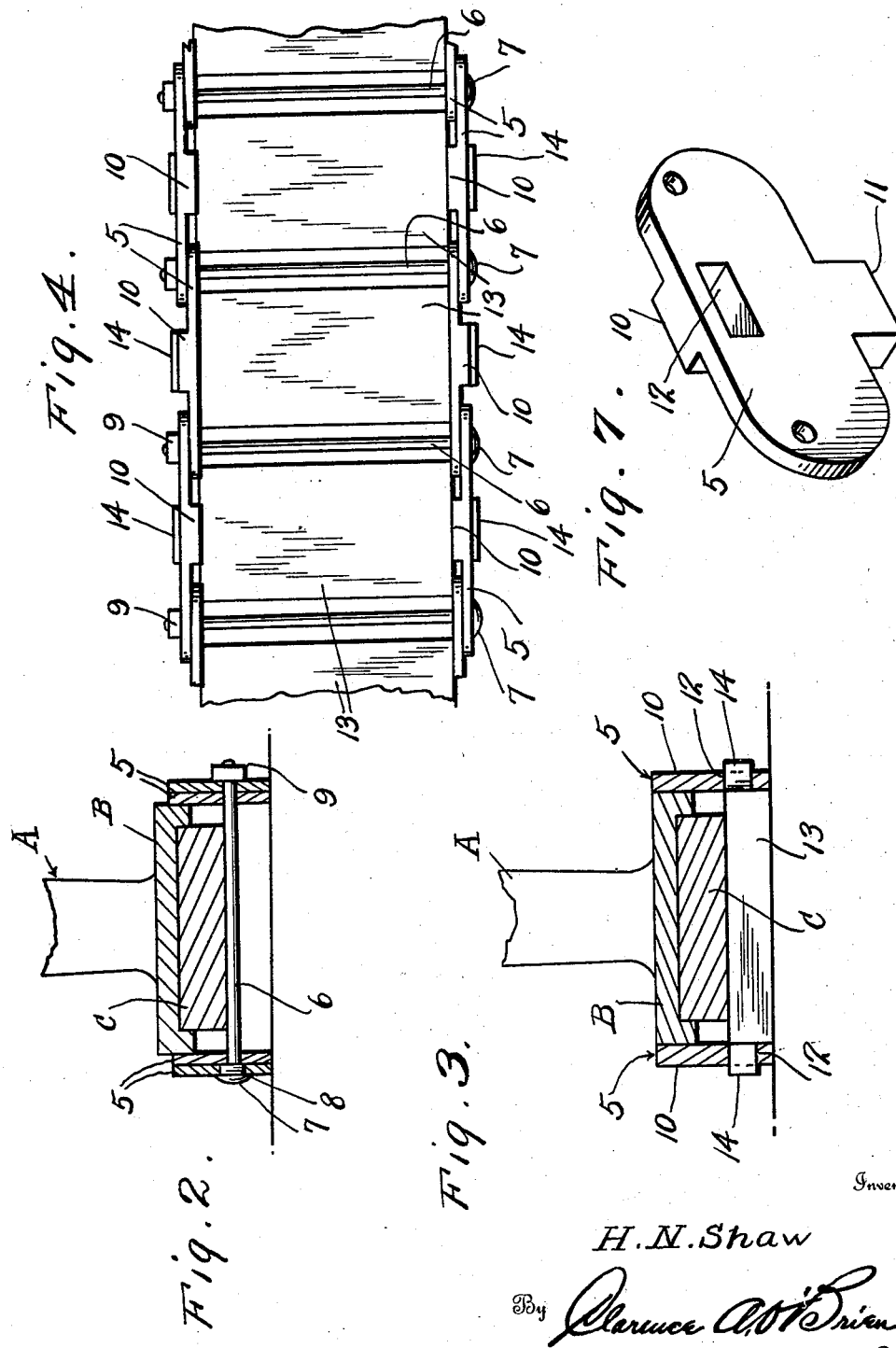
Inventor
H. N. Shaw
By Clarence A. O'Brien
Attorney Patented Nov. 26, 1929

1,737,437

UNITED STATES PATENT OFFICE

HARRY N. SHAW, OF WEST GROVE, PENNSYLVANIA

ANTISKID ARMOR FOR CUSHION-TIRE WHEELS

Application filed February 8, 1928. Serial No. 252,840.

This invention relates to new and useful improvements in anti-skid armors and aims to provide a device of this character that is primarily adapted for arrangement upon automobile truck wheels equipped with solid cushion tires.

An important object of the invention is to provide an armor for cushion tires that may be readily arranged thereon and tightly secured in proper position, so that the same are not flapped when in position and ultimately become displaced from the wheel.

In the drawings, wherein for the purpose of illustration is shown the preferred embodiment of my invention:

Figure 1 is a side elevation of a solid cushion tire wheel equipped with my improved armor.

Figures 2 and 3 are detail cross sectional views taken substantially on the lines 2—2 and 3—3 of Figure 1.

Figure 4 is a fragmentary plan view of the armor.

Figure 5 is a perspective of one of the surface engaging members of the armor, and Figures 6 and 7 are perspectives from opposite sides of one of the link members comprising the side structure of the armor.

Now having particular reference to the drawing, A designates generally a conventional wheel equipped with a rim B upon which is a solid cushion tire C. The invention per se consists of side structures for arrangement at opposite edges of the rim B, these side structures each including a plurality of pivotally interconnected link plates 5, rounded at their opposite ends and having openings at the opposite ends whereby they may be pivotally interconnected preferably through the medium of elongated cross bolts that extend across the surface of the tire C as clearly disclosed in Figure 2. Preferably, the inner ends of these bolts are headed as at 7, while directly in back of the head, each bolt is formed with a squared portion 8 for engagement within a squared opening at one end of the outermost link plate 5, as clearly disclosed also in said Figure 2. The opposite ends of these bolts are threaded and project through the registering openings in the overlapping ends of the link plates at opposite sides of the wheel, after which a nut 9 is threaded thereon.

Intermediate the ends thereof, each plate 5 is formed at one side with a transverse rib 10 that depends below the lower edge of the plate to provide a rim engaging lug 11. Furthermore, each plate is formed intermediate its ends with a longitudinally extending slot 12 that extends through the rib as disclosed in Figure 6.

Arranged between opposed ones of the link plate 5, are tread blocks 13, preferably of wood, the opposite ends thereof being formed with longitudinally extending lugs 14, for snug engagement within the slots 12 of said link plate, as disclosed in Figure 3.

From a consideration of Figure 4, it will be noted that the alternate link plates are arranged so that the ribs 10 will be at the inner sides thereof, while the intermediate ones will be at the outer sides, so that the inner faces of the side links of opposite sides of the armor will have flush engagement with opposite edges of the wheel rim B.

In actual practice, one of the bolts 6 is removed, after which the armor is arranged upon the tire, and the bolt then properly positioned. The tightening of the nuts of the bolts will clamp the link plates in opposite sides of the rim tightly thereagainst and will negative any possibility of the armor wobbling or becoming loose from the tire.

It will thus be seen that I have provided a highly novel, simple and extremely practical anti-skid armor for wheels equipped with cushioned tires, and even though I have herein shown and described the invention as consisting of certain details and structural elements, it is nevertheless to be understood that some changes may be made therein, without affecting the spirit and scope of the appended claims.

Having thus described my invention, what I claim as new is:

1. An anti-skid armor for cushion tired wheels comprising a pair of annular side sections, means composed of a pair of pivotally connected links, detachable tread blocks between said side sections, removable means for securing said sections against said blocks, and means on said links for engagement with the usual rim of the wheel to prevent lateral displacement of the armor.

2. An anti-skid armor for cushion tired wheels comprising a pair of annular side sections, means composed of a pair of pivotally connected links, detachable tread blocks between said side sections, removable means for securing said sections against said blocks, and means on said links for engagement with the usual rim of the wheel to prevent lateral displacement of the armor, said last mentioned means consisting of projections extending laterally from the links.

3. An anti-skid armor for cushion tired wheels comprising a pair of annular side sections, each section consisting of a plurality of pivotally connected links, detachable tread blocks for disposition between said side sections, said blocks being provided with reduced extensions at its ends, the links being provided with openings to receive the extensions, removable means for securing said sections against said blocks, and means on said links for engagement with the usual rim of the wheel to prevent lateral displacement of the armor.

4. An anti-skid armor for cushion tired wheels comprising a pair of annular side sections, each section consisting of a plurality of pivotally connected links, detachable tread blocks for disposition between said side sections, said blocks being provided with reduced extensions at its ends, the links being provided with openings to receive the extensions, removable means for securing said sections against said blocks, and means on said links for engagement with the usual rim of the wheel to prevent lateral displacement of the armor, said last mentioned means consisting of projections extending laterally from the links.

In testimony whereof I affix my signature.

HARRY N. SHAW.